(12) United States Patent
Kirkbride et al.

(10) Patent No.: US 11,619,192 B2
(45) Date of Patent: Apr. 4, 2023

(54) SYNERGISTIC HYBRID PROPULSION

(71) Applicant: The Boeing Company, Chicago, IL (US)

(72) Inventors: David William Kirkbride, Allyn, WA (US); David John Paisley, North Bend, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/305,520

(22) Filed: Jul. 9, 2021

(65) Prior Publication Data

US 2022/0025834 A1 Jan. 27, 2022

Related U.S. Application Data

(60) Provisional application No. 63/054,421, filed on Jul. 21, 2020.

(51) Int. Cl.
| | |
|---|---|
| *F02K 3/02* | (2006.01) |
| *B64D 27/24* | (2006.01) |
| *B60L 50/60* | (2019.01) |
| *B64C 9/00* | (2006.01) |
| *B64C 23/00* | (2006.01) |
| *B64D 29/02* | (2006.01) |
| *B64D 27/18* | (2006.01) |
| *B60L 50/15* | (2019.01) |
| *B64C 3/58* | (2006.01) |
| *B64C 9/38* | (2006.01) |
| *B64C 9/18* | (2006.01) |
| *B64C 9/20* | (2006.01) |
| *B64D 27/12* | (2006.01) |

(Continued)

(52) U.S. Cl.
CPC ............... *F02K 3/02* (2013.01); *B60L 50/15* (2019.02); *B60L 50/60* (2019.02); *B64C 3/58* (2013.01); *B64C 9/00* (2013.01); *B64C 9/18* (2013.01); *B64C 9/20* (2013.01); *B64C 9/38* (2013.01); *B64C 23/005* (2013.01); *B64D 27/12* (2013.01); *B64D 27/18* (2013.01); *B64D 27/24* (2013.01); *B64D 29/02* (2013.01); *F02K 3/06* (2013.01); *B60L 2200/10* (2013.01); *B64C 2009/143* (2013.01); *B64D 2027/026* (2013.01); *F05D 2220/323* (2013.01); *F05D 2220/76* (2013.01)

(58) Field of Classification Search
CPC ..... F02K 3/02; F02K 3/06; F02K 5/00; B60L 50/15; B60L 50/60; B60L 2200/10; B64C 3/48; B64C 3/50; B64C 3/58; B64C 9/00; B64C 2009/143; B64C 9/18; B64C 9/20; B64C 9/38; B64C 23/005; B64D 27/02; B64D 2027/026; B64D 27/12; B64D 27/18; B64D 27/24; B64D 29/02; F05D 2220/323; F05D 2220/76
See application file for complete search history.

(56) References Cited

U.S. PATENT DOCUMENTS

| | | | | |
|---|---|---|---|---|
| 3,397,854 A | * | 8/1968 | Reyle | ..................... B64C 35/008 244/45 R |
| 2016/0332741 A1 | * | 11/2016 | Moxon | ................... B64C 21/00 |

(Continued)

*Primary Examiner* — Loren C Edwards
(74) *Attorney, Agent, or Firm* — Yee & Associates, P.C.

(57) ABSTRACT

A propulsion system is provided. The propulsion system comprises a ducted electric bypass fan and an electrical generator powered by a turbine in an engine and configured to provide electricity to the electric bypass fan.

34 Claims, 10 Drawing Sheets

(51) Int. Cl.
*F02K 3/06* (2006.01)
*B64C 9/14* (2006.01)
*B64D 27/02* (2006.01)

(56) References Cited

U.S. PATENT DOCUMENTS

2017/0203839 A1* 7/2017 Giannini ................ B64D 27/24
2017/0240286 A1* 8/2017 Lemarchand ............ F02K 3/077
2018/0002025 A1* 1/2018 Lents ........................ F02K 3/06

* cited by examiner

SYNERGISTIC HYBRID PROPULSION

CROSS-REFERENCE TO RELATED APPLICATION

This application claims the benefit of U.S. Provisional Application Ser. No. 63/054,421, filed Jul. 21, 2020, entitled "Synergistic Hybrid Propulsion", which is incorporated herein by reference in its entirety.

BACKGROUND INFORMATION

1. Field

The present disclosure relates generally to jet propulsion, more specifically, to bypass airflow of a turbofan engine using a hybrid system.

2. Background

Turbofan jet engines are the standard propulsion system used on modern commercial aircraft. Turbofan engines comprise two streams of airflow through the engine. The first airflow stream passes through the engine core before exiting the engine as exhaust thrust. The second airflow stream, known as bypass flow, passes around the engine core through a bypass duct and is generated by a large fan at the front of the engine. The bypass fan is driven by turbines in the engine core that are turned by the expanding exhaust gases.

Adding bypass airflow to a jet engine increases the mass flow rate to increase the efficiency of the engine, which reduces fuel consumption. Fuel efficiency is often measured as thrust specific fuel consumption (TSFC). Bypass trades exhaust velocity for increased air mass flow by spreading a given amount of mechanical energy (from the turbines) over a larger mass of air. The bypass ratio (BPR) of a turbofan engine is the ratio of the mass flow rate of the bypass stream relative to the mass flow rate of the core stream. As the BPR of a turbofan engine increases, TSFC falls, thereby improving fuel efficiency and contributes to other beneficial factors such as reducing noise.

Therefore, it would be desirable to have a method and apparatus that take into account at least some of the issues discussed above, as well as other possible issues.

SUMMARY

An illustrative embodiment of the present disclosure provides a propulsion system. The propulsion system comprises a ducted electric bypass fan and an electrical generator powered by a turbine in an engine and configured to provide electricity to the electric bypass fan.

Another illustrative embodiment provides an integrated aircraft lift and propulsion system. The system comprises a rigid inboard wing structurally blended with an aircraft fuselage to create a lifting body. A turbofan engine is mounted to the inboard rigid wing. A ducted electric bypass fan coupled to the inboard rigid wing is powered by electricity generated by a turbine in the turbofan engine.

Another illustrative embodiment provides a method of propulsion. The method comprises generating electricity with a turbine in a turbofan engine and powering a ducted electric bypass fan with the electricity generated by the turbine.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
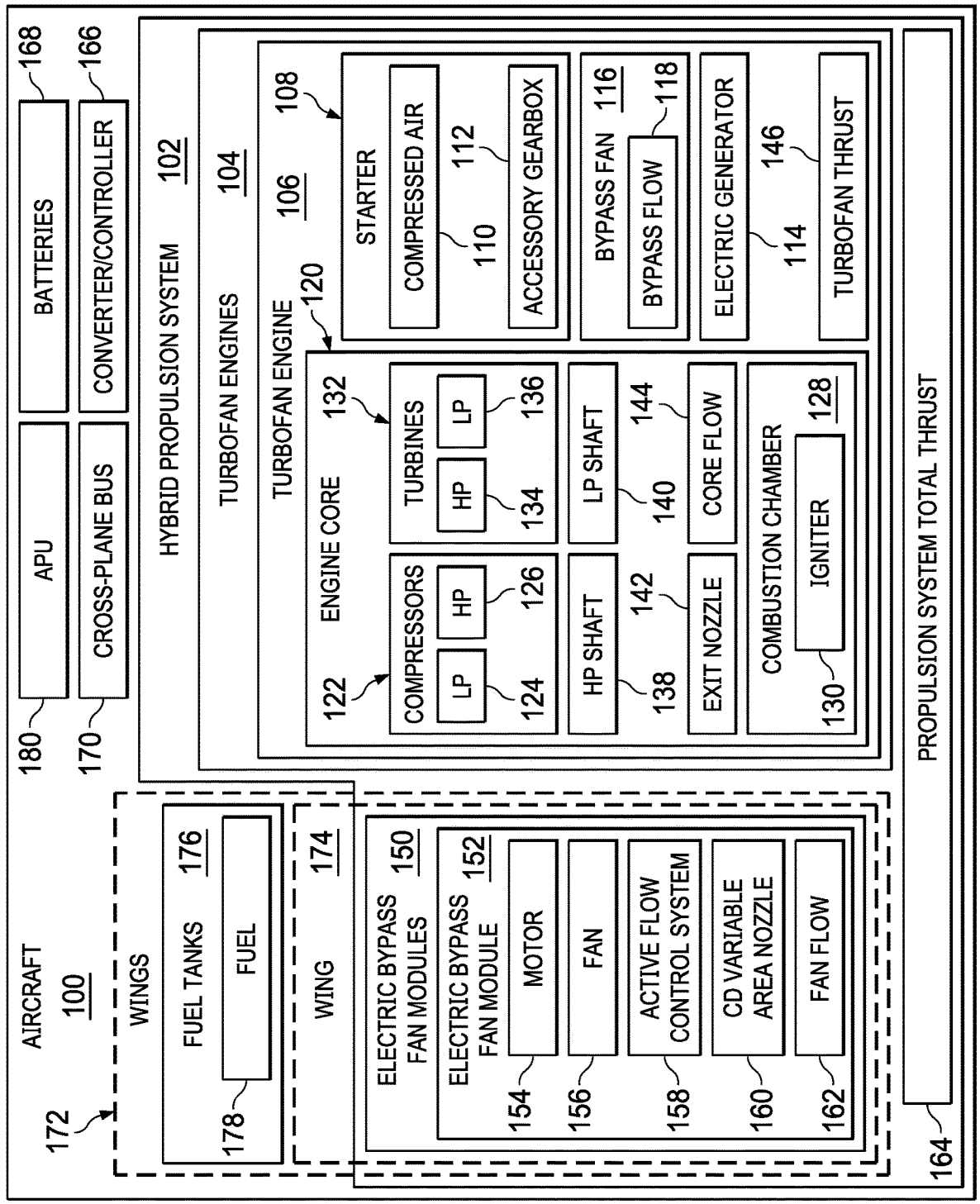
FIG. 1 is an illustration of a block diagram of an aircraft with a synergistic hybrid propulsion system in accordance with an illustrative embodiment.

The illustrative embodiments recognize and take into account one or more different considerations. The illustrative embodiments recognize and take into account that increasing the bypass ratio of turbofan engines increases fuel efficiency by reducing thrust specific fuel consumption. Traditionally, the bypass flow of a turbofan was increased by increasing the size of the bypass duct surrounding the engine core, and consequently, the diameter of the bypass fan and engine cowling.

The illustrative embodiments also recognize and take into account that there are practical limits to how large the diameter of a bypass fan and cowling of a turbofan engine can be. For example, when the engines are mounted below the wing of an airplane, there must be enough clearance between the wing and ground to accommodate the engines. If engine designs merely continue to increase bypass fan diameter, eventually the ground clearance of the plane must be increased through changes in the fuselage design, wing mount position, and/or landing gear height just to accommodate this larger diameter. In addition, increasing diameter also increases drag and engine weight, thereby adversely affecting aerodynamic performance, which at least partially offsets the benefits of the increased bypass.

The illustrative embodiments provide a hybrid propulsion system in which a turbofan engine core powers a number of supplemental, electrically driven bypass fans. The electric bypass fans can be integrated into the wing, which both reduces drag and incorporates the natural aerodynamic airflows of the wing into the airflow of the fans.

The hybrid propulsion system of the illustrative embodiments can generate, for example in certain embodiments, two thirds of the propulsive thrust with electric fan ambient temperature air. Certain examples integrate the propulsive system flows with the wing aerodynamic flows and wing structure. For example, without requiring material changes based on higher temperature compatibility. Partially submerging the electric fan exhaust flow paths into the wing allows placement and alignment of the electric fan exit airflow to increase powered high lift performance (e.g., to supplement other high lift configurations such as the use of flaps and slats in the wings). Partially submerging the electric fan can contribute lift augmentation flow at variable cruise flap offset locations and angles, wherein fan air flowing over a wing flap increases the Coandă effect on the wing aerodynamic flow. The increased Coandă effect allows the flap to be deflected downward to a greater degree than without the fan airflow, which in turn pulls the wing's aerodynamic flow down with it, thereby increasing the aerodynamic circulation of the wing and generating more wing lift. This lift augmentation flow can result in a net higher lift/drag ratio (L/D) across the flight envelope compared to wing lift without partial submersion of the electric bypass fan in the wing.

In some examples, batteries provide a cache of energy and offset the demand on the generator.

The electric motor-driven bypass fans can be operated at their optimum or near optimum fan performance efficiency by varying the fan motor revolutions per minute (rpm), varying the pitch on fan blades, or varying fan exit nozzle geometry/back pressure. The ability to optimize the operating points for both the turbofan and the bypass fans increases efficiency, which reduces fuel consumption. The total efficiency is based on the product of the propulsion system's thermodynamic (fuel burning turbofan engine) and aerodynamic (bypass fan) efficiency.

For example, the overall energy efficiency, $\eta_H$ of an airplane flying from a departure point to destination point is the product of the propulsion system's mechanical efficiency, $\eta_P$, and the airplane's aerodynamic efficiency (L/D); $\eta_H=(\eta_P)*(L/D)$. The amount of fuel burned is related to this efficiency. The synergies in combining ambient air propulsion flows with the aerodynamic flow capitalizes on the positive attributes of seamlessly integrating an electric propulsor, a turbofan propulsor, and the airframe to change and optimize the propulsion thrust scheduling and reconfigurability versus the mission flight envelope to reduce the block fuel burn, in contrast to stand-alone, ultra-high bypass turbofans.

The illustrative embodiments provide a modular design that provides reconfigurable power options to meet the propulsion needs for a family of airplanes from short range to extended range and from high payload fractions to low payload fractions. This reconfigurability is accomplished by optimizing the electric-driven bypass fan propulsor module thrust schedule across the airplane family then combining it with different turbofan cores and battery store capacities to meet the specific needs of a family member. The result is a common inboard wing and fan module structure for the family members.

Turning now to FIG. 1, an illustration of a block diagram of an aircraft with a synergistic hybrid propulsion system is depicted in accordance with an illustrative embodiment. Aircraft 100 has hybrid propulsion system 102 comprising a number of turbofan engines 104 and a number of electric bypass fan modules 150.

In the illustrated example, each turbofan engine 106 among turbofan engines 104 comprises a bypass fan 116 and an engine core 120. In other examples, other configurations are possible such as having only a core with no bypass fan.

At the front of engine core 120 are a series of compressors 122 including low-pressure compressors 124 and high-pressure compressors 126. The compressors may include one or more stages therein. As air moves through compressors 122, it is progressively compressed to higher pressure levels before entering combustion chamber 128. During engine startup a starter system 108 uses compressed air 110 from auxiliary power unit (APU) 180 (or another engine at operating speed) and accessory gearbox 112 to initiate rotation of compressors 122 and help turbofan engine 104 reach self-sustaining speed.

When compressor speed reaches a specified threshold compressed air entering combustion chamber 128 is mixed with fuel 178, drawn from fuel tanks 176 in the wings 172, and ignited by igniter 130. Exhaust gasses exit the engine core 120 through exit nozzle 142.

At the rear of engine core 120 are a series of turbines 132. High-pressure turbines 134 rotate high-pressure shaft 138, which in turn rotates compressors 122. Low-pressure turbines 136 rotate low-pressure shaft 140, which in turn rotates bypass fan 116, producing bypass flow 118. The combination of core flow 144 and bypass flow 118 produces the total thrust 146 for turbofan engine 104.

In the hybrid propulsion system 102 of the illustrative embodiments, an electric generator 114 is coupled to bypass fan 116 and converts mechanical energy supplied by low pressure shaft 140 to electricity.

Electric generator 114 is coupled to converter/controller 166, which can distribute electrical power to batteries 168, cross-plane power bus 170, and motor 154 in electric bypass fan module 152. In certain examples, batteries 168 may be internal batteries or external (e.g., conformal) batteries. Motor 154 is an electrically driven motor and is referred to as electric motor 154 or motor 154. Conversely, converter/controller 166 can also receive electrical power from batteries 168 and distribute it to cross-plane bus 170 and electric motor 154.

Electric-driven bypass fan propulsor modules 150, or simply Efans, herein, supplement the thrust produced by turbofan engines 104. Efans 150 are powered at least in part by energy derived from turbofan engines 104. Each turbofan engine 104 can provide power to a number of Efans 150. In an illustrative embodiment, each turbofan supplies power to two Efans 150, but more or fewer Efans 150 can be powered by a single turbofan.

Efans 150 can also be partially powered by batteries 168. For example, to reduce the demand on the bypass fan 116 in turbofan engine 106. For example, reducing the demand on the bypass fan 116 may allow for a reduced thrust rating of the turbofan core. Great thrust may be required during takeoff than cruise (e.g., cruise 20-30% less than takeoff).

Partially driving the Efans 150 with battery power during takeoff reduces the demand and sizing requirement of the turbofan engines 104.

In the illustrated example, Efans 150 are partially submerged into the wings 172 of aircraft 100.

Each electric-drive bypass fan propulsor module (Efan) 152 comprises an electric motor 154 that drives an electric bypass fan 156. The motor 154 receives electrical power from generator 114 in turbofan engine 106 and possibly from batteries 168 as well.

Electric bypass fan module 152 also comprises active control flow system 158, which controls variable area nozzle 160 to alter thrust during different flight phases and provide thrust pitch vectoring.

The fan exhaust flow 162 from each Efan 152 in combination with the total thrust 146 from each turbofan engine 104 produces the propulsion system total thrust 164.

The illustration of aircraft 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 2:
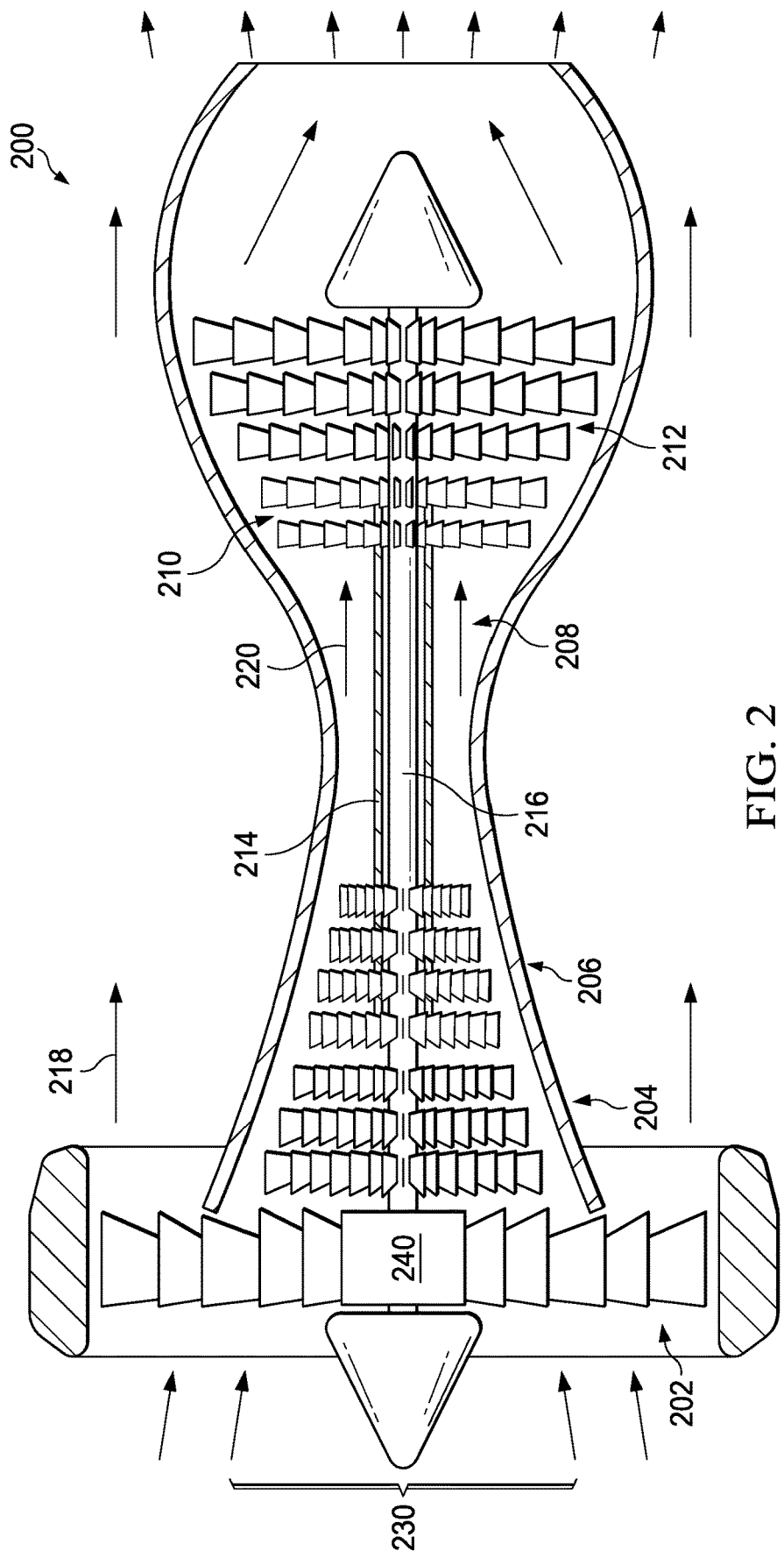
FIG. 2 depicts a cross-section view of a turbofan jet engine with which illustrative embodiments can be implemented.

FIG. 2 depicts a cross-section view of a turbofan jet engine with which illustrative embodiments can be implemented. Engine 200 might be an example of turbofan engine 104 in FIG. 1.

Turbofan engine 200 comprises fan 202, which produced airflow through engine 200. The airflow is divided between bypass airflow 218, which moves around the engine core 230, and core airflow 220, which moves through the engine core 230. In conventional turbofan engines, bypass airflow 218 can account for up to 80 percent or more of the thrust produced by the engine.

As air enters the engine core 230 it passes through a number of low-pressure compressors (e.g., boosters) 204, followed by a number of high-pressure compressors 206. The low-pressure compressors 204 and high-pressure compressors 206 progressively compress the air to higher pressures.

The compressed air moves into compression chamber 208, where it is mixed with fuel and burned. Rapidly expanding exhaust produced from the combustion then passes through a number of high-pressure turbines 210 that rotate high-pressure shaft 214, which in turn rotates high-pressure compressors 206. The exhaust then passes through a number of low-pressure turbines 212 that rotate low-pressure shaft 216, which in turn rotates fan 202.

Electrical generator 240 is coupled to low pressure shaft 216. In operation, rotation of the low-pressure shaft 216 causes the generator 240 to generate electrical energy. In various examples, the generator 240 may be directly or indirectly coupled to the shaft 216. For example, generator 240 may be offset from the engine and coupled to the shaft 216 via a transmission (not shown).

Figure 3:
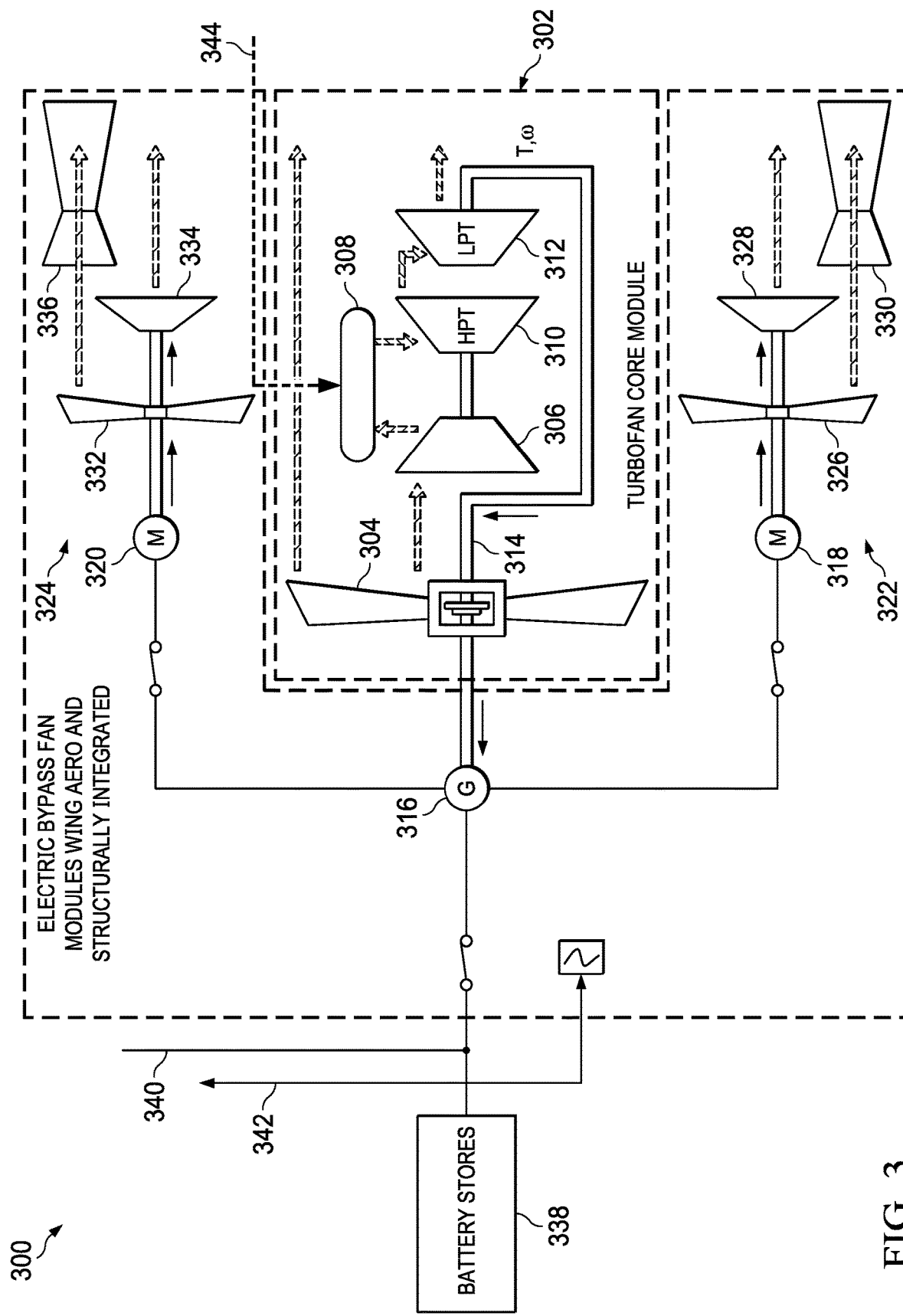
FIG. 3 is a schematic illustration of a turbofan engine operating in conjunction with electric bypass fans in accordance with an illustrative embodiment.

FIG. 3 is a schematic illustration of a turbofan engine operating in conjunction with electric bypass fans in accordance with an illustrative embodiment. Hybrid propulsion unit 300 comprises a single turbofan module 302 that powers two electric bypass fan modules 322, 324. Hybrid propulsion unit 300 might be an example of the operational propulsion unit formed by turbofan engine 104 and Efans 150 shown in FIG. 1.

Fuel 344 is mixed in combustion chamber 308 with compressed air from compressors 306 and burned. The expanding exhaust gases from the combustion rotate high pressure turbines 310, which drive compressors 306, and low-pressure turbines 312, which drive fan 304 through low pressure shaft 314.

Electrical generator 316 is coupled to low pressure shaft 314. Generator 315 generates electricity that can be distributed to electric motors 318, 320, battery stores 338, and cross-plan electrical bus 340.

Electric motor 318 drives fan 326 and compressor 328 in Efan 322. Similarly, electric motor 320 drives fan 332 and compressor 334 in Efan 324. Electric motors 318 and 320 might be powered entirely from electricity generated by turbofan module 302 or might also be partially powered by battery stores 338 to reduce demands on turbofan 302.

Efans 322, 324, also comprise variable convergent-divergent areas 330, 336, respectively, which can provide thrust control and pitch vectoring for different flight phases.

Cross-plane electrical bus 340 allows cross-coupled power distribution between wings. In case of a turbofan failure on one side of the aircraft, electrical power can be diverted from the other side to maintain across-plane thrust balancing with the electric fans on the failure side and mitigate yaw axis asymmetries. Cross-plane power distribution can also compensate for asynchronous flap positioning between the wings.

Figure 4:
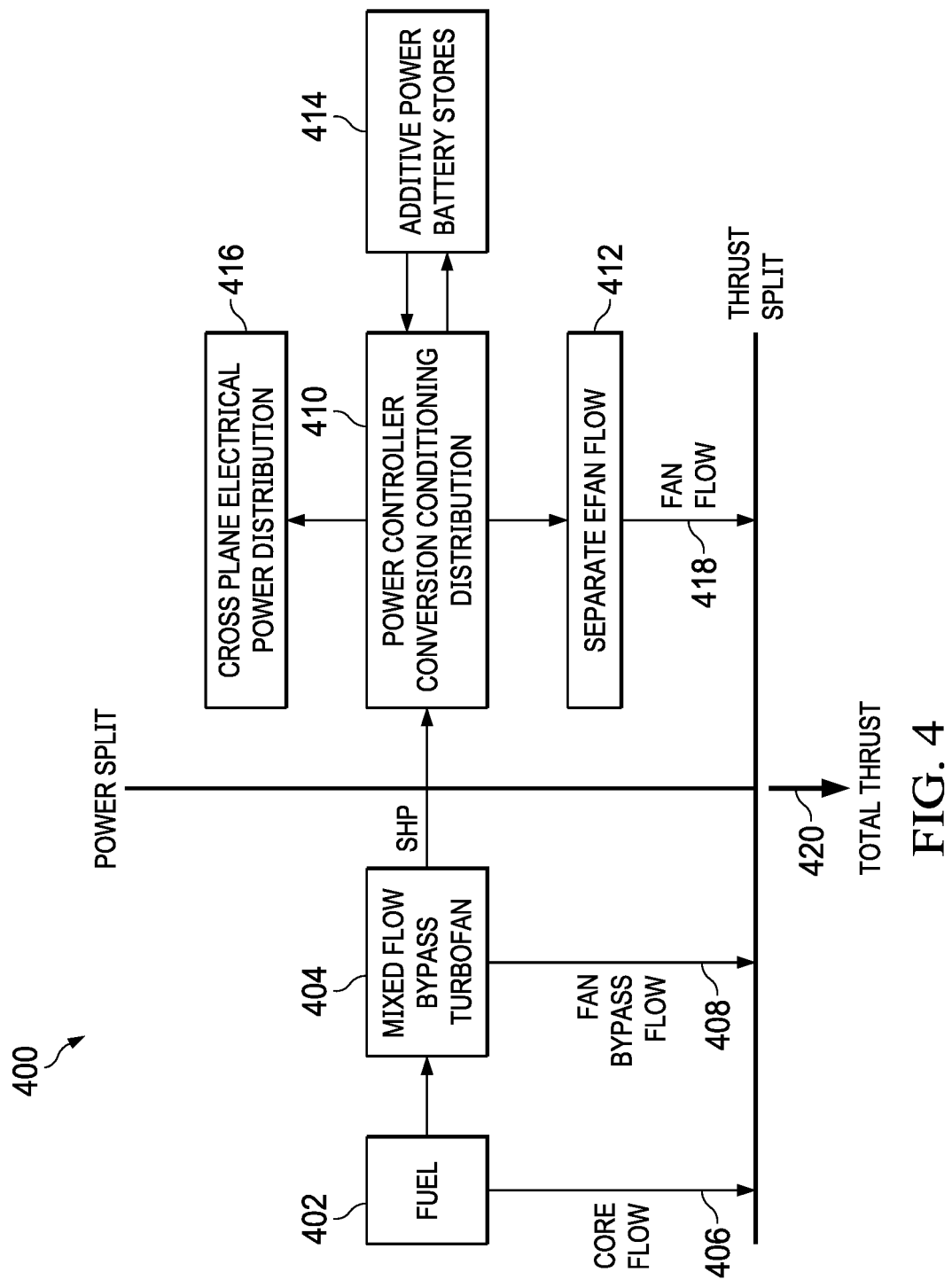
FIG. 4 is a block diagram illustrating the operational architecture of a hybrid propulsion system in accordance with an illustrative embodiment.

FIG. 4 is a block diagram illustrating the operational architecture of a hybrid propulsion system in accordance with an illustrative embodiment. Architecture 400 is an example of the operation of hybrid propulsion system 102 in FIG. 1 and hybrid propulsion unit 300 in FIG. 3.

Thrust Specific Fuel Consumption (TSFC) is inversely proportional to the propulsion system's overall efficiency, which equals the product of the system's propulsive efficiency times its thermal dynamic efficiency. In component terms, a low TSFC is achieved by an optimum combination of bypass ratio (BPR), overall pressure ratio (OPR), and turbine inlet temperature. In general, as BPR increases, TSFC goes down, but propulsion system weight and drag go up.

Thrust lapse rate (i.e. decreasing thrust with increasing flight speed) also increases with BPR. Therefore, as BPR is increased at cruise (to reduce cruise TSFC) the thrust available at takeoff increases. Architecture 500 routes some of this excess thrust to generate powered lift at takeoff, climb out, and acceleration to cruise. The power controller 410 supplies commands to the parallel power sources of the turbofan 404 and battery 414 to meet thrust level requirements versus flight conditions versus fuel expenditure, allowing electricity supplied to the electric bypass fans to be variably apportioned between the turbofan's electric generator and the battery stores according to flight phase.

For example, in a takeoff phase battery 414 might supply the majority of electricity to the Efans 412, thereby reducing demands on the turbofan 404. As another example, during a climb phase electricity supplied to Efans 412 might be more evenly apportioned between the turbofan 404 and battery 414. During a cruise phase electricity might be supplied to the Efans 412 exclusively by turbofan 404. Furthermore, turbofan 404 might also recharge battery 414 during the cruise phase. During a loiter phase battery 414 might again provide a majority of the electricity to Efans 412 to conserve fuel. During a taxi phase all of the electricity supplied to Efans 412 might come from battery 414, allowing turbofan 404 to remain off during taxi. During a descent phase the Efans 412 can be used to harvest electrical energy by acting as windmill generators to recharge battery 414. During a landing phase, battery power can be held in reserve for emergency power to provide electricity to Efans 412 in the event of turbofan failure or for go-around power for aborted landings.

This ability to reroute excess thrust allows for reduction in weight and wing area and increased L/D across the flight envelope to gain a net reduction in block fuel burn (e.g., total fuel burned from engine start to engine shut down at the ends of the mission).

As energy is release from fuel 402 combusted in turbofan 404, the resulting power output is split between the turbofan 404 and Efans 412. Partially submerging the electric driven, counter rotating Efans 412 in the wings, together with variable pitch thrust, provides powered high lift during takeoff and climb, which allows the total thrust 420 to be split between the core flow 406/bypass flow 408 from the turbofan 404 and the fan exhaust flow 418 from the Efans 412. Dividing thrust between the turbofan 404 and fan exhaust flow 418 can provide bypass ratios from 6-11 (typical of current turbofan engines) up to ultra-high bypass ratios of 14-20. By employing rpm control, variable pitch fan blades, and variable geometry exit nozzles to counter-rotating Efans 412, hybrid architecture 400 can be operated at fan pressure ratios down to, for example, 1.2, allowing fan thrust efficiencies (i.e. thrust out versus shaft horse power input) of up to 0.90-0.95 or more. By comparison, single stage bypass fans in turbofan engines typically are limited to thrust efficiencies of 0.80-0.85. This difference in fan thrust efficiency is due to the slower velocity of the air moving through Efans 412. The slower the velocity of air moving through a fan, the less energy is lost (entropy) in generating exhaust flow. Therefore, a large mass of air moving slowly through a fan generates less wasted energy to provide the same amount of thrust as a smaller mass of air moving more rapidly. Shaft horsepower put into a fan is equal to the fan torque times the shaft rpm. The thrust force generated by the fan is equal to the difference in momentum (mass times velocity) between the air moving through the fan and the air flow around the fan. By decoupling the exhaust flow of the Efans 412 from the turbofan 404, the turbofan and Efans can operate independently at respective optimal performance levels.

In addition to distributing electrical power generated from the turbofan 404 to Efans 412, the power controller 410 can provide cross-plane power distribution in case of turbofan failure on the other wing. Controller 410 can also distribute electrical power to additive battery stores 414 or conversely drawn electrical power from the battery stores 414 for distribution to Efans 412 or cross-plane distribution 416.

Additive battery stores 414 can supplement power to Efans 412 to reduce thrust requirements of the turbofan 404, particularly on takeoff, and can be used as a backup power source for cross-plane distribution 416 in case of turbofan failure. Generally, turbofan jet engines are sized to meet sea level takeoff thrust requirements, which are approximately 60-70% greater than thrust produced at cruise altitudes. The reduced thrust at cruise altitudes is partially due to the lower density of air mixed with the fuel to produce thrust (thrust lapse). However, because of the lower air density at higher altitudes, less thrust is required to propel an aircraft at cruise altitudes. Therefore, the climb to cruise altitudes after take-off typically starts at a maximum required takeoff thrust and then decreases thrust to a lower level required for cruise.

By combining battery-supplied power with turbine-supplied power to meet takeoff thrust requirements, the size of the turbofan engine can be reduced to meet required cruise thrust without using battery power. The electric bypass fans can therefore contribute a larger proportion of total thrust during takeoff flight phase than during cruise flight phase. The turbofan can be sized in excess of cruise thrust requirements to generate enough surplus power to recharge the batteries. Since, time for takeoff and climb is typically shorter than time spent at cruise, battery power can be expended primarily over the relatively shorter timeframe of takeoff and climb and recharged over the relatively longer cruise timeframe. The net results can allow a reduction in turbofan size of up to 15-20% compared to a turbofan engine that must meet the same total flight thrust requirements without assistance from battery-powered electric bypass fans.

Figure 5:
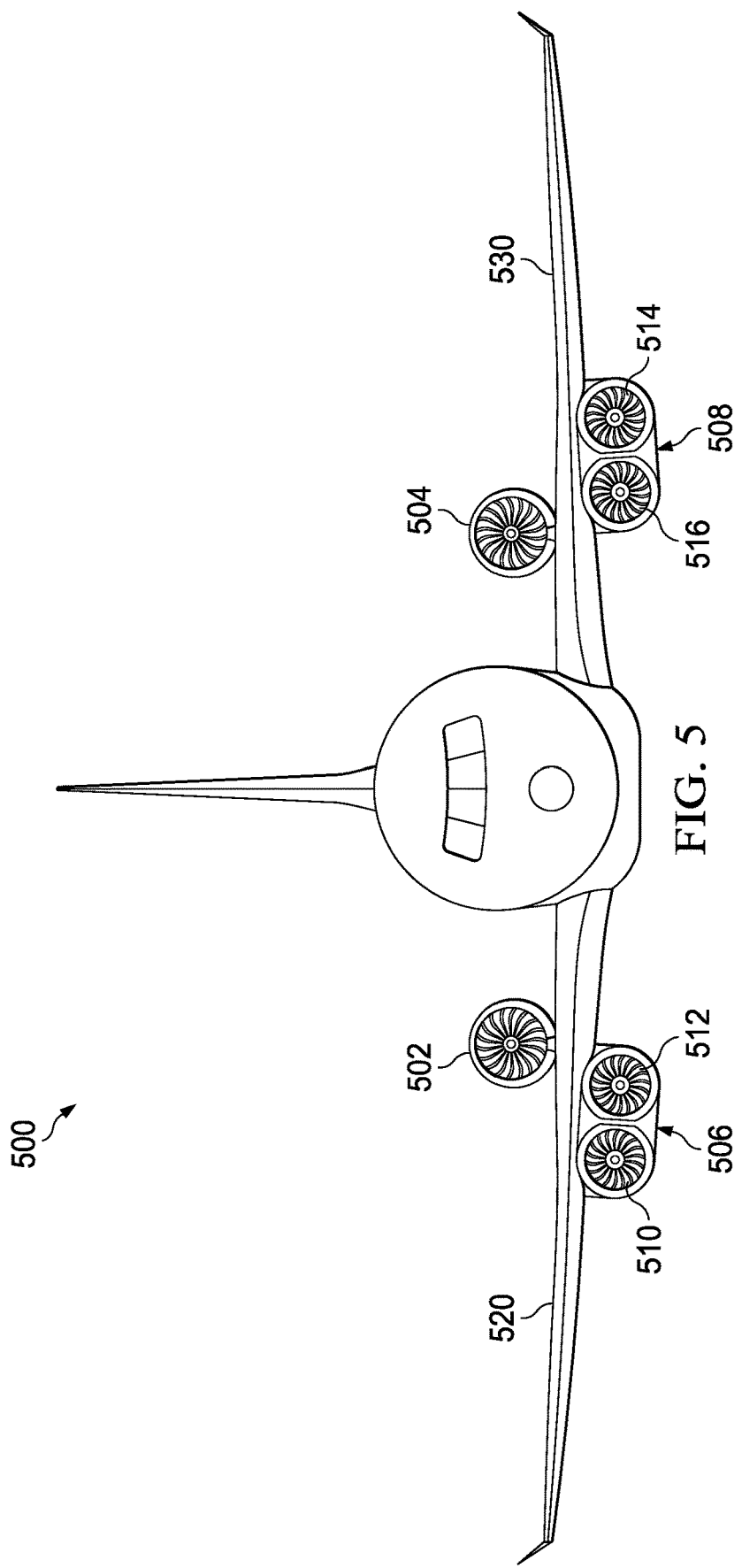
FIG. 5 illustrates an airplane hybrid propulsion system in accordance with an illustrative embodiment.

FIG. 5 illustrates an airplane hybrid propulsion system in accordance with an illustrative embodiment. Airplane 500 in FIG. 5 might be an example of aircraft 100 in FIG. 1.

In this illustrative example, airplane 500 comprises two turbofan engines 502, 504 mounted in above-wing nacelles on wings 520, 530, respectively. Airplane 500 also comprises housings 506, 508 integrated into the lower surface of wings 520, 530, respectively. Housing 506 contains Efans 510, 512, and housing 508 contains Efans 514, 516.

Electrical power for E fans 510, 512 is provided by turbofan 502. Similarly, electrical power for Efans 514, 516 is provided by turbofan 504. Electrical power to Efans 510, 512, 514, 516 can also be partially supplied by battery stores (not shown) to reduce turbofan demands.

Figure 6:
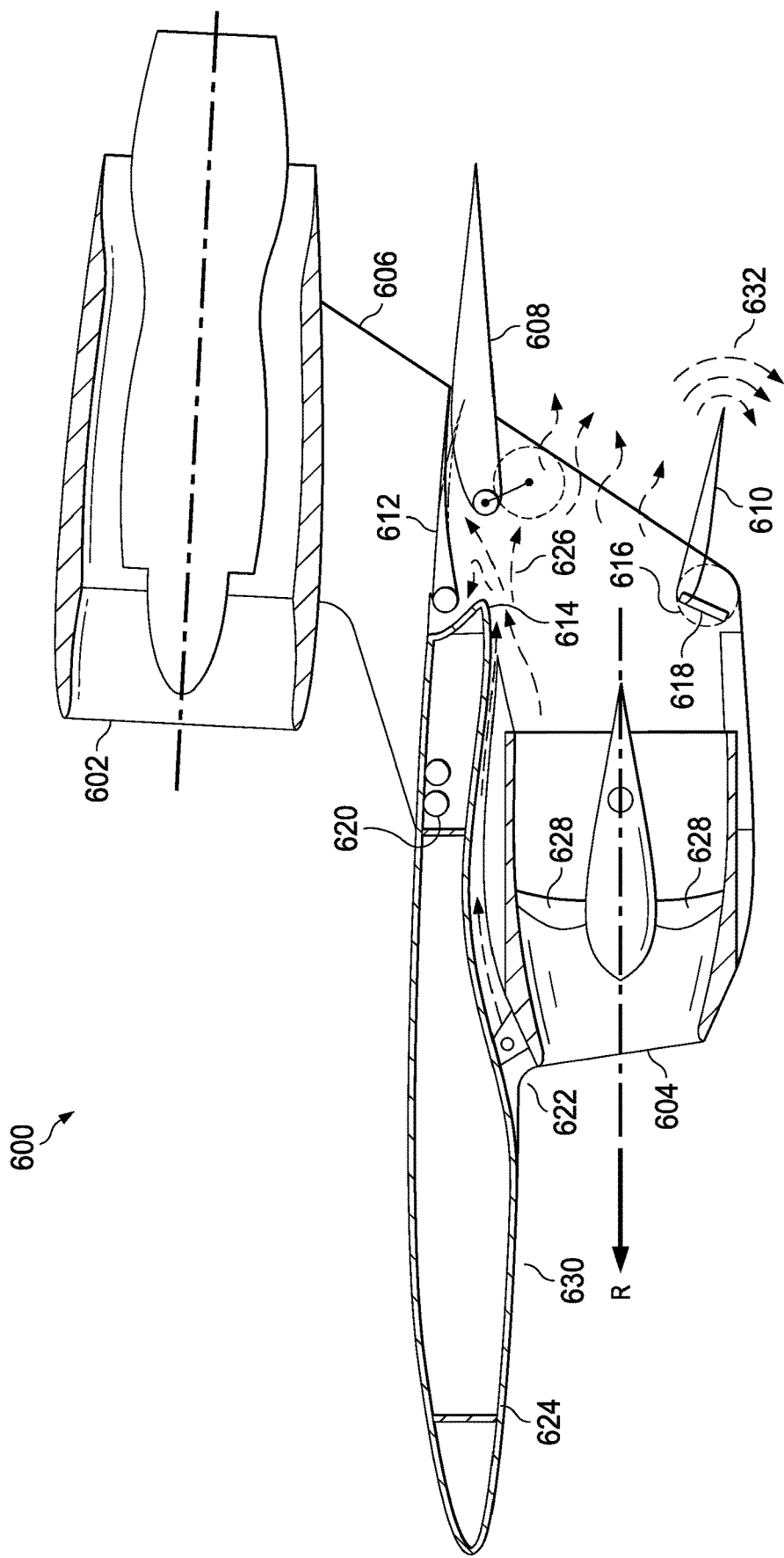
FIG. 6 illustrates a cross-section view of a hybrid propulsion system integrated with a wing lift body in accordance with an illustrative embodiment.

FIG. 6 illustrates a cross-section view of a hybrid propulsion system integrated with a wing lift body in accordance with an illustrative embodiment. Propulsion system 600 is a possible example cross-section of turbofan 504, Efans 510, 512, and wing 530 shown in FIG. 5. The use of electric driven fans to generate ambient air thrust to meet high proportions of the airplane's total thrust requirements introduces an opportunity to significantly expand propulsion system design to include synergisms and integrations of the airframe and propulsion that are not afforded by higher temperature turbofan only propulsion systems.

Hybrid propulsion system 600 comprises an aft, above-wing nacelle turbofan 602, which might be an example of the turbofan engines shown in FIGS. 1-5, respectively. The pylon 606 on which turbofan 602 is mounted is integrated with the wing 624.

Below wing 624 is mounted an electric fan module 604 containing two electric fans (only one of which is visible in the cross-section view of FIG. 6). Electric fan module 604 might be an example of housing 506 containing Efans 510, 512 shown in FIG. 5. As shown in FIG. 6, the housing of electric fan module 604 is integrated with and partially submerged into a lower surface 630 of wing 624. In the example embodiment, electric fans in module 604 are ducted and counter rotating to each other.

Electric fan module 604 comprises 2D convergent-divergent variable geometry exits nozzles formed by trailing edge flap 608 and lower divergent flap 610. A variable geometry nozzle is a nozzle whose cross-sectional area can be changed to adjust the exit pressure of exhaust to ambient pressure. Trailing edge flap 608 forms a compression boundary for fan exhaust in high lift takeoff, approach, and landing modes. Trailing edge flap 608 might comprise a single jetted slot Fowler flap capable of rotating between +1° to −40°. During cruise, the trailing edge flap 608 might only move between +1° and −6° to provide variable wing camber in cruise modes.

Nozzle lower divergent flap 610 might comprise a single blown slotted, variable wing camber powered high-lift flap.

The lower divergent flap 610 is coupled to lower convergent step flap 618. Both are controlled by flap drive train 616, which can rotate the lower nozzle flaps 610, 618 ±30°. In an example, Flap drive train 616 comprises an electric ring stepper motor (not shown) and a flap angle drive torque motor (not shown). Lower flap 610 can provide cruise lift coefficients modulation for different flight conditions, resulting in a higher cruise Mach lift-to-drag ratio (ML/D).

The electric fan module 604 directs at least a portion of electric fan exhaust flow 626 to a high lift device. A high-lift device, as used herein, is a component on a wing that increases the amount of lift produced by the wing, e.g., flaps and slats. In the illustrated example fan exhaust flow 626 is encouraged to and through trailing edge flap 608 via a channel 622 between the high lift device and the wing 624.

The leading-edge lower surface of wing 624 acts as an external compression surface for inlet flow to electric fan module 604. The external compression surface redirects airflow passing over the surface into the inlet of the electric fan module 604, thereby increasing compression within the electric fan module 604 above that produced by rotation of the fan alone.

Integration of the electric fan module 604 into wing 624 forms a boundary layer diverter. The boundary layer refers to the part of the airflow that is close to the wing surface, which is subject to separation and wakes, resulting in drag. Jetted flow source manifold 614 provides active boundary layer flow control together with drooped spoiler 612. Drooped spoiler 612 might comprise jetted bridge seals for boundary layer control. By actively controlling airflow at the boundary layer, manifold 614 and dropped spoiler 612 reduce flow separation and drag.

Cross-plane power busses 620 are also structurally integrated into wing 624 in this illustrated example.

Figure 7:
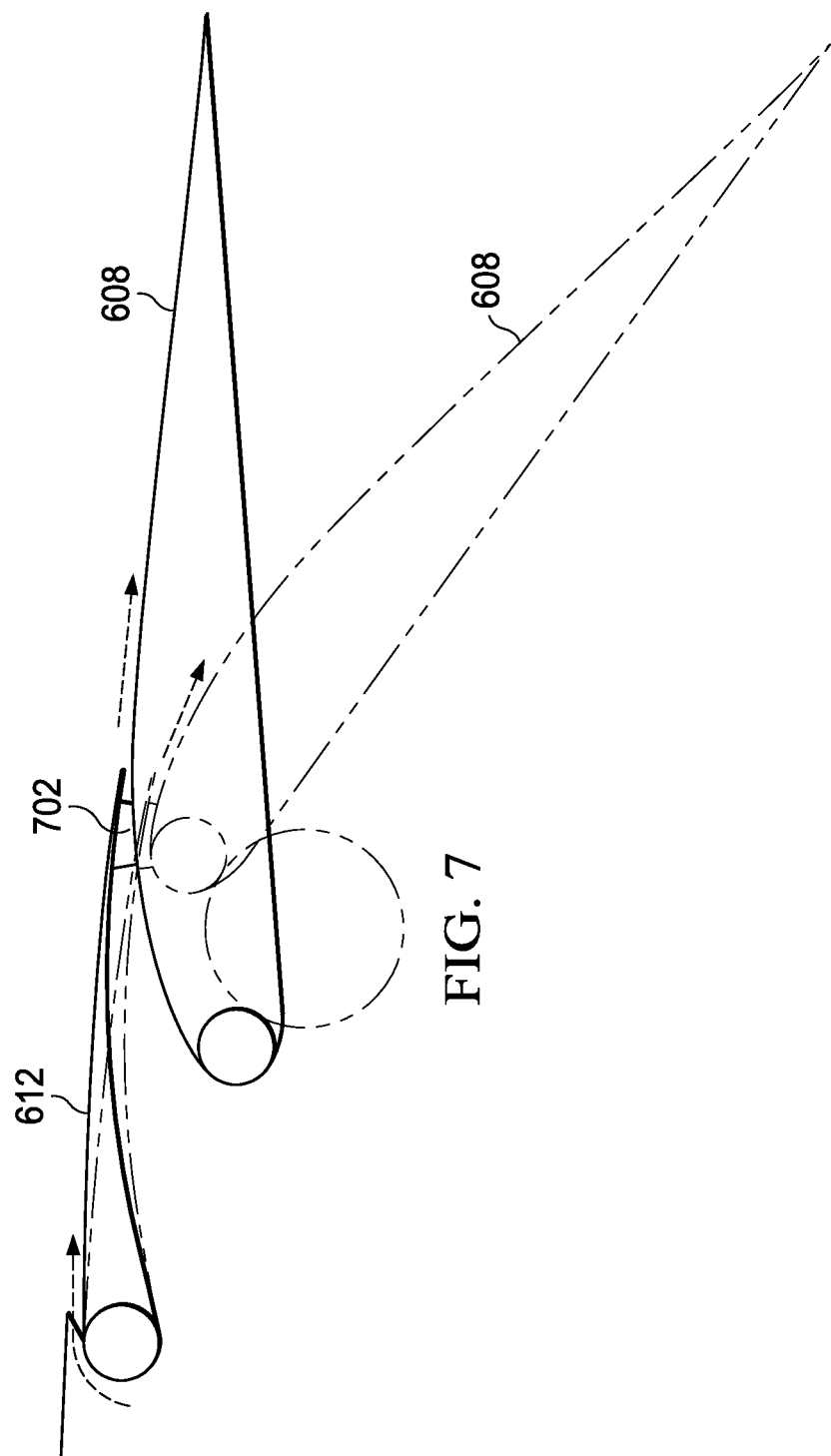
FIG. 7 illustrates the operation of the dropped spoiler with the wing trailing edge to control boundary layer flow in accordance with an illustrative embodiment.

FIG. 7 illustrates the operation of the dropped spoiler with the wing trailing edge to control boundary layer flow in accordance with an illustrative embodiment. As shown in FIG. 7, drooped spoiler 612 maintains contact with trailing edge flap 608 as the flap changes angle. Positioned between the spoiler 612 and trailing edge flap 608 is an expanding open lattice variable slotted jet 702. In an embodiment, the height of slotted jet 702 might be 0.04 in. to 0.08 in.

Drooped spoiler 612 and slotted jet 702 together form an assembly that maintains a clamping force on trailing edge flap 608 as it changes angle.

The integration of the hybrid propulsion system with the wing increases wing-propulsion system structural efficiency and reduces propulsion system aerodynamic drag. Airplane trim drag is reduced based on a reduced installed net thrust, pitching moment arm and inflight modulation of thrust pitching moment.

Engine thrust is generally directed in the aft direction relative to the aircraft. Thrust reversing, as used herein, refers to redirecting at least a portion of the thrust generated by the engine in a forward direction as generally marked by the Arrow marked R, to provide aircraft reversing and maneuvering capabilities.

In some embodiments, thrust reversing operation is performed by configuring the architecture 600 to direct at least a portion of the thrust in the R direction (e.g., by causing a portion of exhaust flow 632 to flow in the R direction). For example, trailing edge flap 608 and lower divergent flap 610 may be actuated downwardly to cause exhaust flow 632 from fan module 604 to partially exit in the R direction (e.g., forcing air downwardly or reversing flow). As another option, blades 628 of fan module 604 may be variable pitch blades capable of changing the pitch of the blade relative to the long axis of the blades. During thrust reverse operation, the pitch is set to cause the blades 628 to generate reverse thrust in direction R (e.g., to a negative pitch or Beta range as is known in the art). Additionally, or optionally, trailing edge flap 608 and divergent flap 610 may be situated to encourage airflow in the R direction. For example, trailing edge flap 608 may move upwardly and lower divergent edge flap 610 may move downwardly to encourage air to enter the engine from the aft end.

In addition to thrust pitch vectoring, the electric fans can provide thrust reversal by counter rotating the fans, thereby reducing wear on landing gear breaks and reducing the need for turbofan thrust reversal.

The illustrative embodiments provide improved engine transport and handling by separating the ultra-high bypass from the engine. For medium-to-long missions (e.g., 1200-2600 nautical miles), the hybrid propulsion system allows the use of an ultra-high bypass ratio with cruise thrust and fuel burn optimization with cruise-matched wing sizing, e.g., smaller wing size, reduced wing weight and drag. This cruise-matching wing sizing can be coupled with enhanced powered lift low speed field performance.

For short-to-medium range missions (e.g., 500-1200 nautical miles), the hybrid propulsion system allows decreased fuel burn by downsizing the turbofan and relying more on additive battery powered takeoff and meeting safe engine off performance certification.

Battery power might also be used to taxi with the electric bypass fans rather than the turbofan engine to reduce fuel consumption. Electricity from the battery can be used to taxi exclusively with the electric bypass fans.

Figure 8:
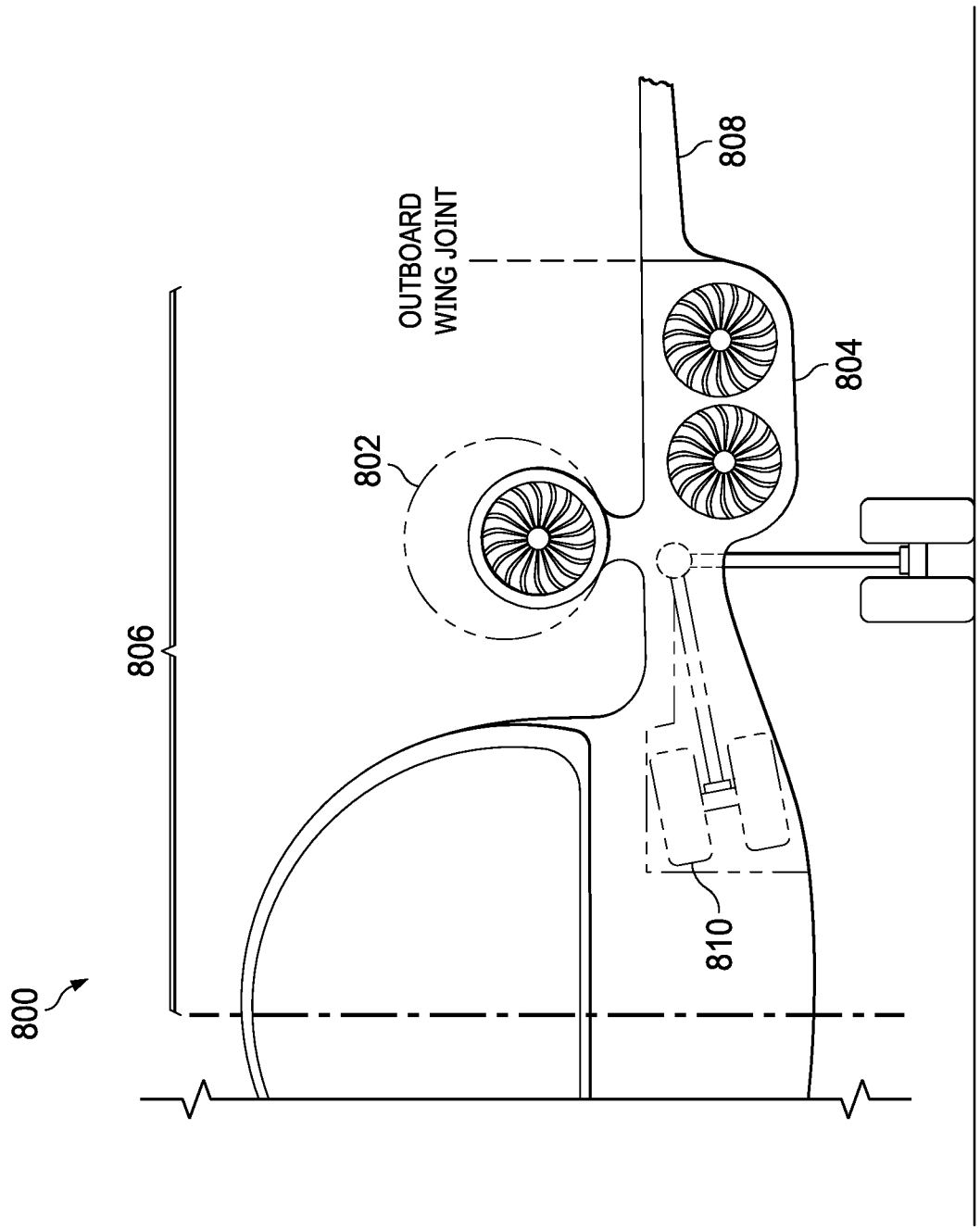
FIG. 8 illustrates a partial front cross-section view of a modular airplane configuration in accordance with an illustrative embodiment.
Figure 9:
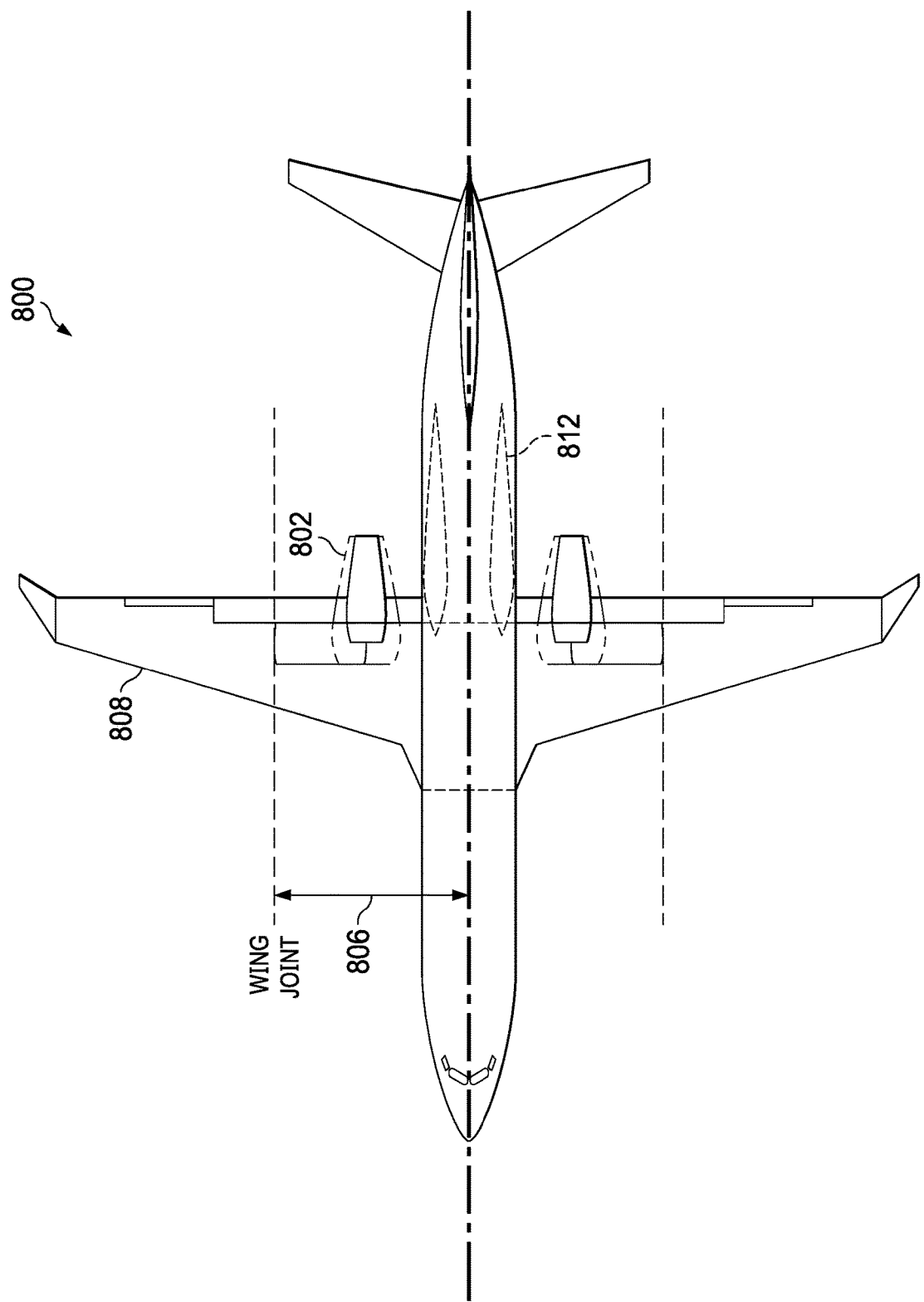
FIG. 9 illustrates a top view of a modular airplane configuration in accordance with an illustrative embodiment.

FIG. 8 illustrates a partial front cross-section view of a modular airplane configuration in accordance with an illustrative embodiment. FIG. 9 illustrates a top view of the modular airplane configuration.

Modular airplane configuration 800 can use a single-sized structurally integrated inboard rigid wing 806 and electric fan modules 804 for a family of aircraft. The nacelle turbofan 802, outboard wing 808, and landing gear 810 can be varied to match different mission profiles.

The modularity of turbofan 802 and outboard wing 808 allows cost effective mixing and matching. Outboard wing options can be matched to different turbofan BPRs according to mission needs.

FIG. 9 illustrates a top view of the modular airplane configuration in accordance with an illustrative embodiment. The use of a rigid wing center body 806 reduces the span of the outboard wing 808. The rigid inboard wing 806 also reduces inboard longitudinal wing torsional loading versus propulsion system mass distribution and increases the section's moment of inertia. Furthermore, the reduction in the span of outboard wing 808 reduces the outboard span deflection and wing aerodynamic twisting, which in turn reduces aileron adverse flight control effects. This allows for a lighter weight outboard wing 808 with improved stall characteristics.

Additive conformal battery stores 812 can be mounted on airplane hard point mounts. External battery stores 812 allow rapid gate turnaround time for removal and replacement with fully controlled ground based charged battery stores.

The illustrative embodiments provide aerodynamic and structural synergies resulting from the integration of ambient air electric fan propulsion. Integrating the electric fan modules into the wings allows implementation of powered high-lift technologies and other wing lift augmentation without imposing temperature penalties on the wing structure or imbedded wing system components. The installed weight and performance optimization of these lifting technologies is facilitated by using the wing structure itself to direct and distribute the powered lift flows. Structural wing-fan integration allows the electric fan thrust flow impingement positioning versus all flap settings and direct flow into the jetted flow source manifold to reduce wing flow separations and instabilities. This reduction in flow separations results in improved aerodynamic performance across (high lift/low drag) across the flight profile.

Figure 10:
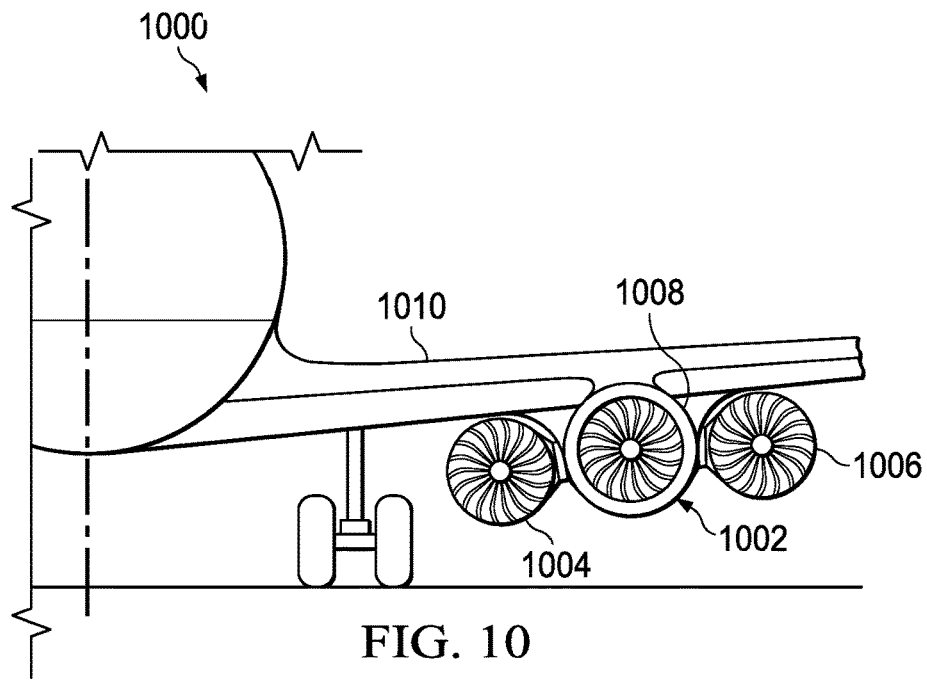
FIG. 10 depicts a partial front view of a hybrid propulsion system in accordance with an alternate illustrative embodiment.

FIG. 10 depicts a partial front view of a hybrid propulsion system in accordance with an alternate illustrative embodiment. In hybrid propulsion system 1000, the turbofan engine 1002 is mounted under wing 1010. Electric fan modules 1004, 1006 flank and are mounted on opposite sides of turbofan engine 1002.

In this configuration, with the electric fans 1004, 1006 mounted to the turbofan 1002, it is the turbofan housing 1008 that is integrated into wing 1010.

Figure 11:
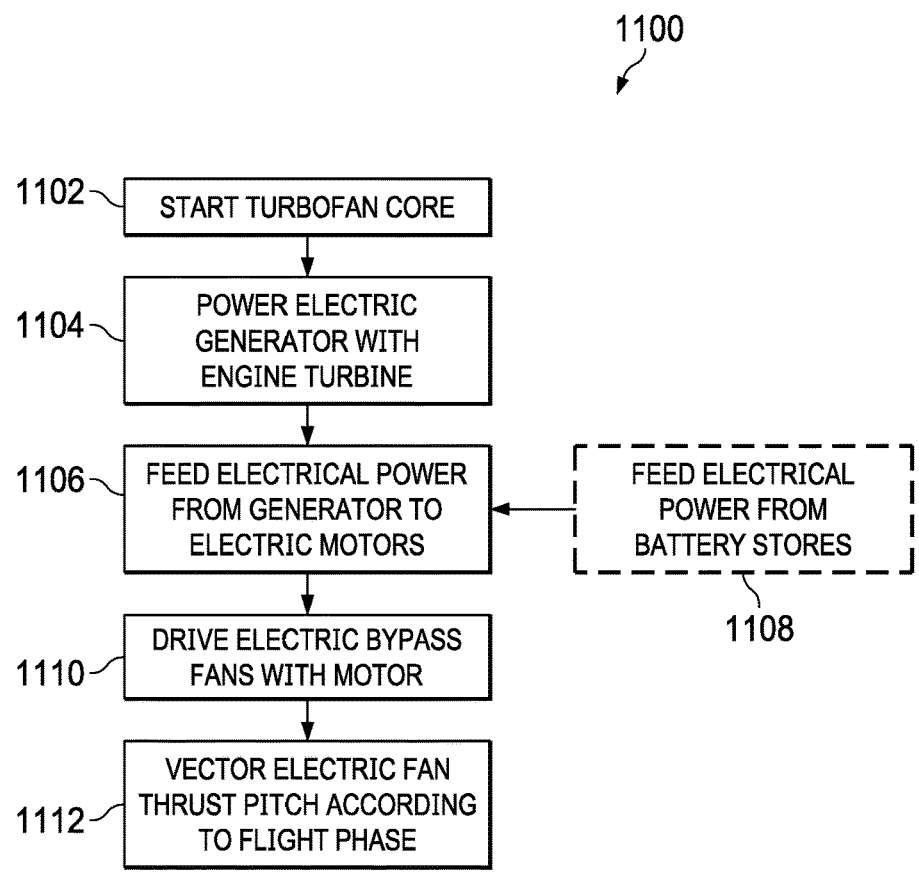
FIG. 11 is a flowchart illustrating a process flow for operating a hybrid propulsion system in accordance with an illustrative embodiment.

FIG. 11 is a flowchart illustrating a process flow for operating a hybrid propulsion system in accordance with an illustrative embodiment. Process 1100 begins by start a turbofan engine and getting it up to operating speed (step 1102). Mechanical energy from the engine is used to power an electric generator that is mechanically coupled to the turbofan turbine (step 1104).

Electric power from the generator is then fed to a number of electric motors (step 1106). Optionally, electric power to the motors might also be supplied by battery stores, particularly during takeoff and climb to reduce requirements on the turbofan engine (step 1108).

The electric motors in turn drive a number of respective electric bypass fans that are integrated integrating into the aircraft wings (step 1110). The electric bypass fans have variable geometry nozzles that vector the pitch of fan thrust according to flight phase (step 1112).

As used herein, a first component "connected to" or "coupled to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A propulsion system, comprising:
   a turbofan engine;
   a housing separate from the turbofan engine;
   a pair of counter rotating, ducted electric bypass fans contained in the housing;
   an electrical generator powered by a turbine in the turbofan engine and configured to provide electricity to the electric bypass fans;
   wherein the electric bypass fans further comprise a variable geometry exit nozzle configured to vector exhaust flow; and
   wherein the variable geometry exit nozzle comprises:
      a trailing edge flap comprising a single jetted slot Fowler flap; and
      a lower divergent flap comprising a single blown slotted flap.

2. The propulsion system of claim 1, further comprising a battery that provides electricity to the electric bypass fans.

3. The propulsion system of claim 2, wherein electricity supplied to the electric bypass fans is variably apportioned between the electrical generator and the battery according to a flight phase of an aircraft.

4. The propulsion system of claim 3, wherein:
   electricity is supplied to the electric bypass fans from the battery during takeoff phase; and
   the battery is charged by the turbine during cruise phase.

5. The propulsion system of claim 2, wherein the battery is an external battery.

6. The propulsion system of claim 1, further comprising:
   a jetted flow source manifold upstream from the trailing edge flap;
   a drooped spoiler positioned between the jetted flow source manifold and the trailing edge flap, wherein the drooped spoiler maintains a clamping force on the trailing edge flap as the trailing edge flap changes angle; and
   an expanding open lattice variable slotted jet sandwiched between the drooped spoiler and the trailing edge flap, wherein the jetted flow source manifold and the drooped spoiler provide active boundary layer flow control.

7. The propulsion system of claim 1, wherein the electric bypass fans are configured to provide thrust reversing operation.

8. The propulsion system of claim 1, wherein the housing containing the electric bypass fans is partially submerged into a lower surface of a wing.

9. The propulsion system of claim 8, wherein the electric bypass fans direct at least a portion of exhaust flow to a high lift device via a channel between the high lift device and the wing.

10. The propulsion system of claim 9, wherein the high lift device comprises flaps or a control surface in the wing.

11. The propulsion system of claim 8, wherein a leading-edge lower surface of the wing forms an external compression surface that redirects boundary layer airflow passing over the lower surface of the wing into inlet flow to the housing containing the electric bypass fans, thereby increasing compression above that produced by rotations of the electric bypass fans alone.

12. The propulsion system of claim 1, wherein the electric bypass fans contribute a larger proportion of total thrust during a takeoff flight phase of an aircraft than during a cruise flight phase of the aircraft.

13. An integrated aircraft lift and propulsion system, the system comprising:
an inboard rigid wing structurally blended with an aircraft fuselage to create a lifting body;
a turbofan engine mounted to the inboard rigid wing;
a housing separate from the turbofan engine and partially submerged into a lower surface of the inboard rigid wing; and
a pair of counter rotating, ducted electric bypass fans contained in the housing, wherein the electric bypass are powered by electricity generated by a turbine in the turbofan engine;
wherein the electric bypass fans comprise a variable geometry exit nozzle configured to vector exhaust flow; and
wherein the variable geometry exit nozzle comprises:
a trailing edge flap comprising a single jetted slot Fowler flap; and
a lower divergent flap comprising a single blown slotted flap.

14. The aircraft lift and propulsion system of claim 13, wherein the electric bypass fans contribute lift augmentation flow at variable cruise flap offset locations and angles.

15. The aircraft lift and propulsion system of claim 13, wherein the electric bypass fans direct at least a portion of exhaust flow to a high lift device via a channel between the high lift device and the wing.

16. The aircraft lift and propulsion system of claim 13, wherein a leading-edge lower surface of the inboard rigid wing forms an external compression surface that redirects boundary layer airflow passing over the lower surface of the wing into inlet flow to the housing containing the electric bypass fans, thereby increasing compression above that produced by rotations of the electric bypass fans alone.

17. The aircraft lift and propulsion system of claim 13, wherein the turbofan engine comprises an electrical generator coupled to the turbine.

18. The aircraft lift and propulsion system of claim 13, further comprising a battery, wherein the electric bypass fans receive electricity from the battery, and wherein electricity received by the electric bypass fans is variably apportioned between the turbine and the battery according to a flight phase of the aircraft.

19. The aircraft lift and propulsion system of claim 18, wherein the battery is an external battery.

20. The aircraft lift and propulsion system of claim 18, wherein electricity from the battery is used to taxi exclusively with the electric bypass fans.

21. The aircraft lift and propulsion system of claim 18, wherein:
electricity is supplied to the electric bypass fans from the battery during takeoff phase; and
the battery is charged by the turbine during cruise phase.

22. The aircraft lift and propulsion system of claim 13, wherein the electric bypass fans comprise variable pitch fan blades.

23. The aircraft lift and propulsion system of claim 13, wherein the electric bypass fans are configured to provide thrust reversing operation.

24. The aircraft lift and propulsion system of claim 13, wherein the turbofan engine is mounted in an above-wing nacelle.

25. The aircraft lift and propulsion system of claim 13, wherein the electric bypass fans contribute a larger proportion of total thrust during a takeoff flight phase than during a cruise flight phase.

26. A method of propulsion, the method comprising:
generating electricity with an electrical generator powered by a turbine in a turbofan engine; and
powering a pair of counter rotating, ducted electric bypass fans with the electricity generated by the turbine, wherein the electric bypass fans are contained in a housing that is separate from the engine;
wherein the electric bypass fans comprise a variable geometry exit nozzle configured to vector exhaust flow; and
wherein the variable geometry exit nozzle comprises:
a trailing edge flap comprising a single jetted slot Fowler flap; and
a lower divergent flap comprising a single blown slotted flap.

27. The method of claim 26, further comprising powering the electric bypass fans with a battery.

28. The method of claim 27, further comprising variably apportioning electricity supplied to the electric bypass fans between the turbine and the battery according to a flight phase of an aircraft.

29. The method of claim 28, further comprising using electricity from the battery to taxi exclusively with the electric bypass fans.

30. The method of claim 28, further comprising:
supplying electricity to the electric bypass fans from the battery during takeoff phase; and
charging the battery with the turbine during cruise phase.

31. The method of claim 26, further comprising varying a pitch of fan blades in the electric bypass fans according to a flight phase of an aircraft.

32. The method of claim 26, further comprising varying the geometry of the exit nozzle of the electric bypass fans for thrust pitch vectoring.

33. The method of claim 26, further comprising reversing thrust of the electric bypass fans.

34. The method of claim 26, wherein the electric bypass fans contribute a larger proportion of total thrust during a takeoff flight phase of an aircraft than during a cruise flight phase of the aircraft.

* * * * *